(12) United States Patent
Whitmore

(10) Patent No.: US 6,183,624 B1
(45) Date of Patent: Feb. 6, 2001

(54) RESTORATION OF CONCRETE DECKS

(76) Inventor: David W. Whitmore, 474 Dovercourt Drive, Winnipeg Manitoba (CA), R3Y 1G4

( * ) Notice: Under 35 U.S.C. 154(b), the term of this patent shall be extended for 0 days.

(21) Appl. No.: 09/424,289

(22) PCT Filed: Jun. 12, 1998

(86) PCT No.: PCT/CA98/00578

§ 371 Date: Nov. 22, 1999

§ 102(e) Date: Nov. 22, 1999

(87) PCT Pub. No.: WO98/57907

PCT Pub. Date: Dec. 23, 1998

Related U.S. Application Data

(63) Continuation of application No. 08/873,914, filed on Jun. 16, 1997, now abandoned.

(30) Foreign Application Priority Data

Jun. 13, 1997 (CA) .................................... 2207709

(51) Int. Cl.$^7$ ..................................... C23F 13/00
(52) U.S. Cl. ........................................... 205/724; 205/734
(58) Field of Search ..................................... 205/724, 734; 404/19.21; 204/196.01, 196.17, 196.3

(56) References Cited

U.S. PATENT DOCUMENTS 5,968,339 * 10/1999 Clear .................................... 205/730
6,027,633 * 2/2000 Whitmore ............................. 205/734

* cited by examiner

Primary Examiner—Bruce F. Bell
(74) Attorney, Agent, or Firm—Adrian D. Battison

(57) ABSTRACT

Restoration of a concrete roadway is effected by application onto the upper surface of the roadway of steel sheets which are used as an anode for electrolytic transfer of ions between the anode and the reinforcing bars of the concrete as cathode. The steel sheets are placed in effect directly on top of the concrete surface so as to communicate forces from the traffic to the concrete surface without the necessity for separate support of the sheets. An intervening layer may be formed of particulate material, a very thin felt or there may be no intervening layer. The sheets can be formed by two layers of steel with the upper layer embossed and the edges offset so as to define flanges allowing the sheets to be bolted together. A covering wear layer such as asphalt can be applied on top of the sheets.

14 Claims, 3 Drawing Sheets

RESTORATION OF CONCRETE DECKS

This application is a continuation of U.S. patent application Ser. No. 08/873,914 filed Jun. 16, 1997, now abandoned.

BACKGROUND OF THE INVENTION

This invention relates to a method for restoration of concrete decks of the type over which vehicles can pass, the method allowing the restoration of the concrete structure while vehicles are allowed to pass over the concrete structure. This method is particularly but not exclusively designed for use with concrete bridge decks so that the concrete can be restored while the bridge is still in normal operation. However the method may also be used in other horizontal concrete structures.

It is known that concrete can be restored by generating movement of ions within the concrete structure between an anode located on the exterior of the concrete structure and a cathode defined by the conventional metal reinforcing members within the concrete. An electrolyte is carried in a porous material between the outside surface of the concrete and the anode.

Various restorative effects can be obtained using this method including particularly the extraction of chloride ions from the concrete which would otherwise cause corrosion of the metal reinforcement leading to degradation of this structure and spalling of the concrete material covering the reinforcing members.

Examples of this method are shown and described in detail in a brochure by Norcure Chloride Removal Systems Inc. entitled "Is Salt Induced Corrosion Causing Problems with your Concrete Structures", in a brochure by Vector Construction entitled "The Concrete Restoration and Protection Specialists" and in a brochure by "Fosroc/NCTAS" entitled "Norcure Desalination". These brochures describe a technique which is used for various concrete structures including bridge decks and the brochure by Fosroc shows particularly a technique in which a bridge deck is restored using this anodic method.

In the brochure and as generally used in practice, after the concrete surface is exposed by removal of any covering layers, a porous material is laid down onto the upper surface and this receives an electrolyte. The porous material is then covered by a mesh type electrode in the form of wire netting which is then covered by a further layer of the porous material.

A current supply is connected between the mesh anode and the reinforcing steel of the concrete and over an extended period of many weeks this acts to cause transfer of ions from the concrete material through the electrolyte to provide a restorative effect.

However the conventional technique using the layers of porous material and the wire mesh anode require that the bridge deck be placed out of operation for the extended period of the restoration. While this can be accommodated in some cases, it does of course severely restrict traffic flow.

The increased usage of salt as a de-icing agent in freezing conditions has severely exacerbated the problem of chloride degradation of concrete.

Up till now, therefore, in practice it has not been possible to operate this technique without the necessity for closing the concrete structure to passing vehicles or traffic and this disadvantage has in effect prevented the use of this restorative technique.

U.S. Pat. No. 5,296,120 (Bennett et al assigned to ELTECH Systems Corporation and issued Mar. 22, 1994) discloses an anode system for use in the above method. However this technique as disclosed in the patent has achieved little or no commercial success and has in effect been abandoned.

The main disclosure of the patent relates to an anode construction which can be rolled into a supply roll for transportation and then can be unrolled into place. The patent also mentions an additional embodiment in which a rigid sheet is applied on top of the unrolled anode structure and supported relative to the anode structure on spacers which hold the rigid plate upward from the horizontal concrete surface and thus prevent the application of forces from the rigid sheet onto the anode structure.

The patent states that the rigid sheet can be non conductive such as wood or plastic. The patent further states that the rigid sheet can be steel, in which case the steel will be in electrical connection to the anode structure and thus will act to some extent as an anode. Such steel anodes are consumed during the electrolytic process and this is advantageous in some circumstances. It is clear however in all circumstances in this patent that the "backing sheet" of steel or other material is intended as an addition to the anode structure including the wire mesh and is intended to be held supported from the underlying concrete surface by spacers to prevent the application of loads to the anode structure itself.

As stated above the techniques disclosed in passing in this patent have not been adopted in practice.

A further example is disclosed in U.S. Pat. No. 5,141,607 issued Aug. 25, 1992 (Swiat assigned to Corrpro Companies Inc). This patent discloses in the embodiment of FIG. 3 a technique for horizontal decks. The anode is a mesh-type anode embedded within a porous material.

This arrangement is the conventional arrangement for this type of process. The applicant is well aware of the work carried out by the assignee of Swiat in the United States around the time of the application. All published material relating to this work is concerned solely with vertical structures of the type shown in FIGS. 1 and 2. It is believed that the work did not include any restoration of horizontal surfaces such as bridge decks. Furthermore it is believed that this work was abandoned and did not lead to any commercial success. In addition to the specific embodiment disclosed, Swiat mentions a number of other alternatives but provides no details of how these may be accomplished.

The prior art therefore discloses a method for restoration of an existing set concrete deck comprising:

providing a generally horizontal load bearing concrete deck having a generally horizontal upper surface over which traffic can pass, the concrete deck having metallic reinforcing elements and the concrete therein being in a set condition;

placing on the horizontal upper surface an electrically conductive anode;

connecting an electrical current between the metallic reinforcing elements as a cathode and the electrically conductive anode so as to cause current to flow therebetween;

providing an electrolyte between the anode and the upper surface so that the current causes movement of ions between the anode and the cathode within the concrete;

SUMMARY OF THE INVENTION

It is one object of the present invention, therefore to provide an improved electrolytic restoration method for horizontal concrete structures which enables the structure to be used during the restoration method for the passage of vehicles, thus obviating the necessity for closing the structure during the extended treatment period.

The invention is therefore characterized in the steps of:

providing the electrically conductive anode so as to consist solely of a rigid sheet of a consumable steel material having an upper surface and a substantially planar lower surface which is placed onto the upper surface of the concrete deck with the electrolyte therebetween such that the ions are withdrawn from the concrete into the electrolyte;

attaching the rigid sheet to the deck to prevent movement of the sheet relative to the deck;

causing the traffic to pass over the upper surface of the sheet while the sheet is in place on the concrete deck such that forces from the traffic are communicated through the upper surface to the sheet;

and locating the planar lower surface of the sheet relative to the upper surface of the concrete deck such that, substantially over the full area of the sheet, each point on the lower surface of the sheet receives direct support from a corresponding underlying point on the upper surface of the concrete deck and that forces applied to the upper surface of the sheet by the traffic are communicated directly from the lower surface of the sheet to the upper surface of the concrete deck through the corresponding points.

The invention is therefore distinguished by the following features:

a) The anode is formed as a rigid steel sheet, which is preferably imperforate, as opposed to the conventional mesh material.

b) The anode is formed solely by the steel sheet so as to distinguish it from arrangements in which a steel sheet is used and constitutes to some extent an anode but that anode is used in conjunction with a conventional mesh anode.

c) The forces communicated from the vehicles to the steel sheet are directly communicated from the steel sheet to the deck substantially at all positions or points on the sheet so as to distinguish it from an arrangement using spacers.

d) The steel sheet is attached to the deck to prevent relative movement.

e) The concrete is in a set condition as it is part of an existing structure for restoration.

f) The steel sheet is arranged so that there is electrolyte between the steel sheet and the deck so that ions drawn upwardly by the steel sheet in an electrolytic process escape from the upper surface of the deck into the electrolyte for disposal.

BRIEF DESCRIPTION OF THE DRAWINGS

One embodiment of the invention will now be described in conjunction with the accompanying drawings in which.

DETAILED DESCRIPTION

A concrete roadway is indicated generally at 10 along which vehicles one of which is generally indicated at 11 can move in traffic flow. The concrete roadway forms part of a structural member such as a bridge but the remaining structural elements of the bridge are not shown as these are well known to one skilled in the art. The structure element as shown in FIG. 4 includes a layer of concrete 12 within which is buried reinforcing steel bars 13 in a conventional manner.

Figure 4:
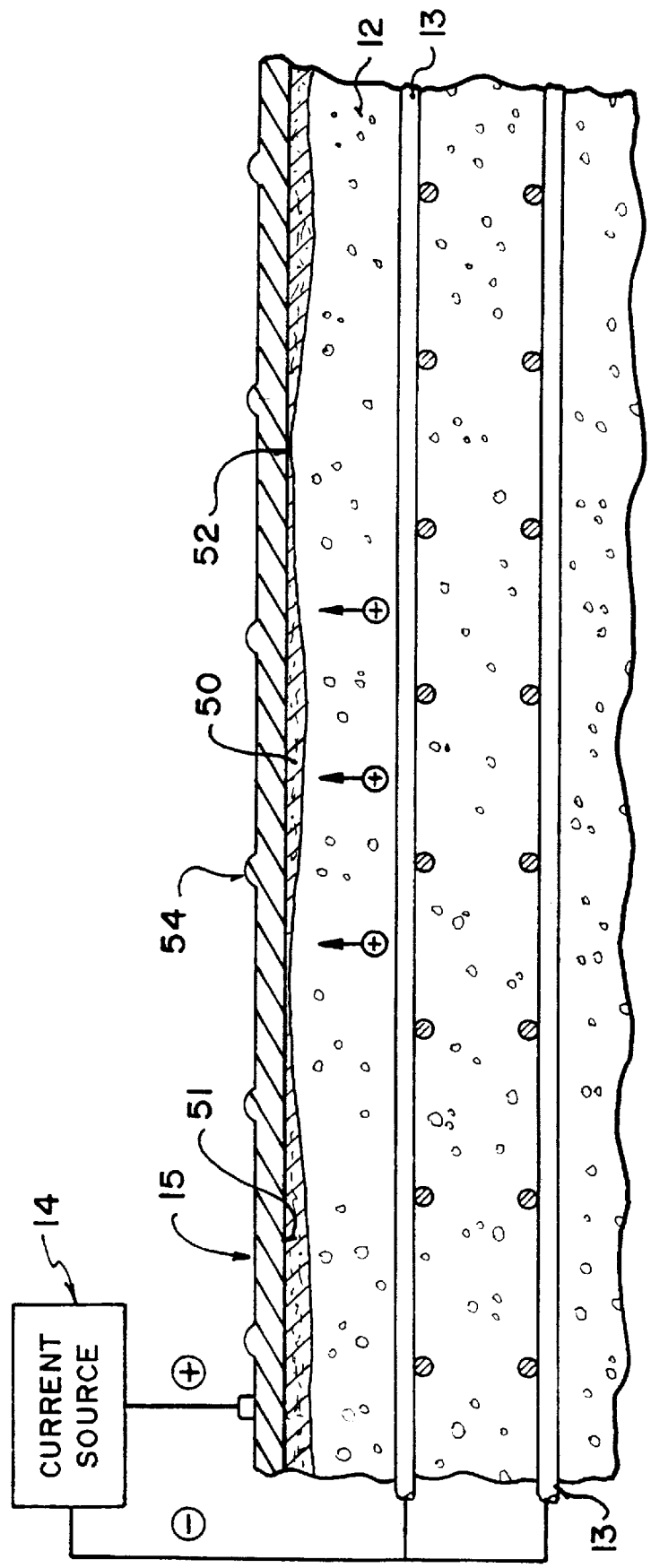
FIG. 4 is a yet further cross sectional view similar to that of FIGS. 2 and 3 showing a yet further modified arrangement.

The concrete roadway can be restored using an electrolytic method which causes the transfer of ions as shown in FIG. 4 which are moved through the concrete material from the reinforcing bars 13 to an anode. In general this method is known as described herein above and requires a current source 14 which is connected to the anode 15 and to the bars 13 as best shown in FIG. 4.

Figure 1:
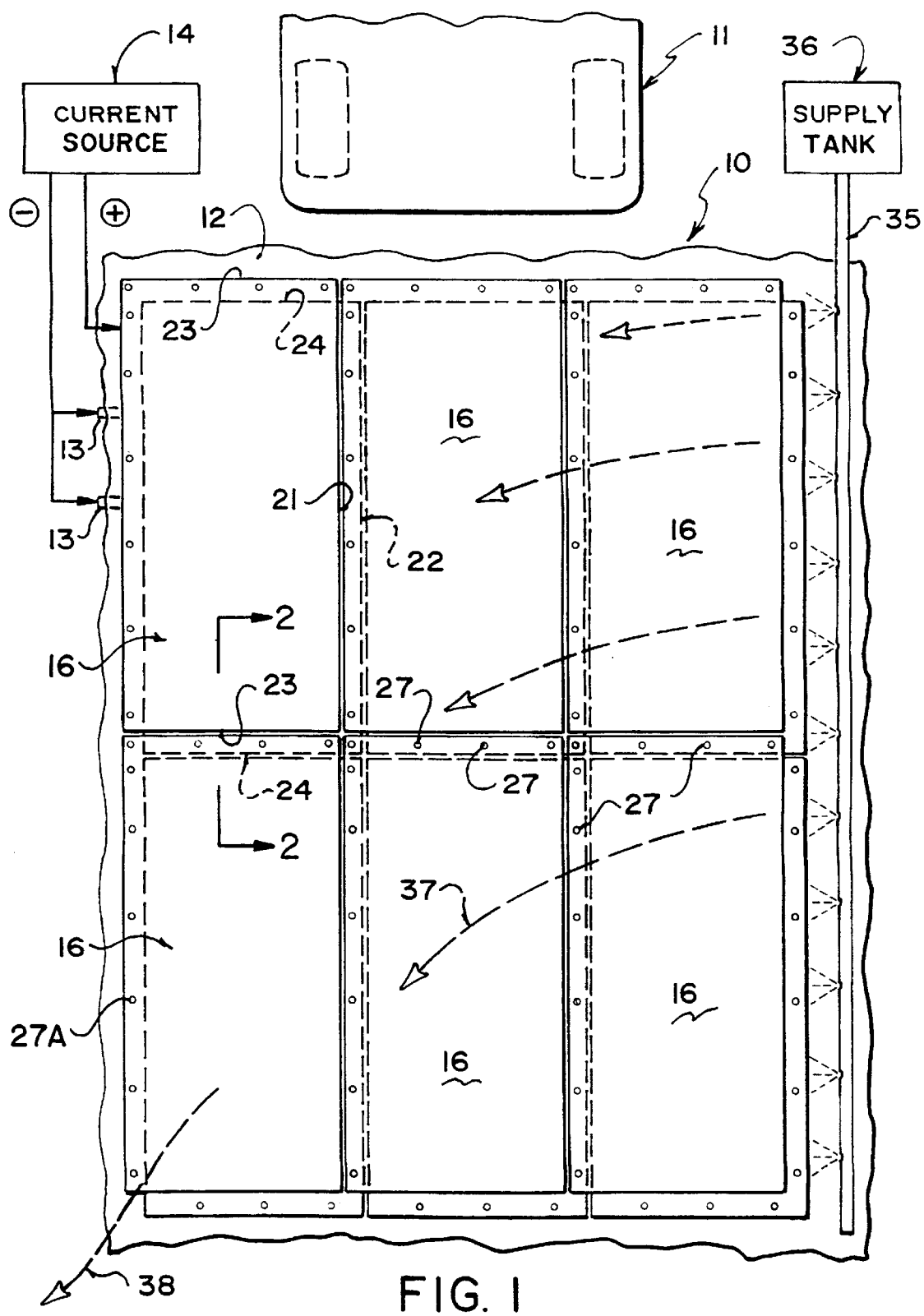
FIG. 1 is a top plan view showing schematically a method for restoration of concrete according to the present invention.
Figure 2:
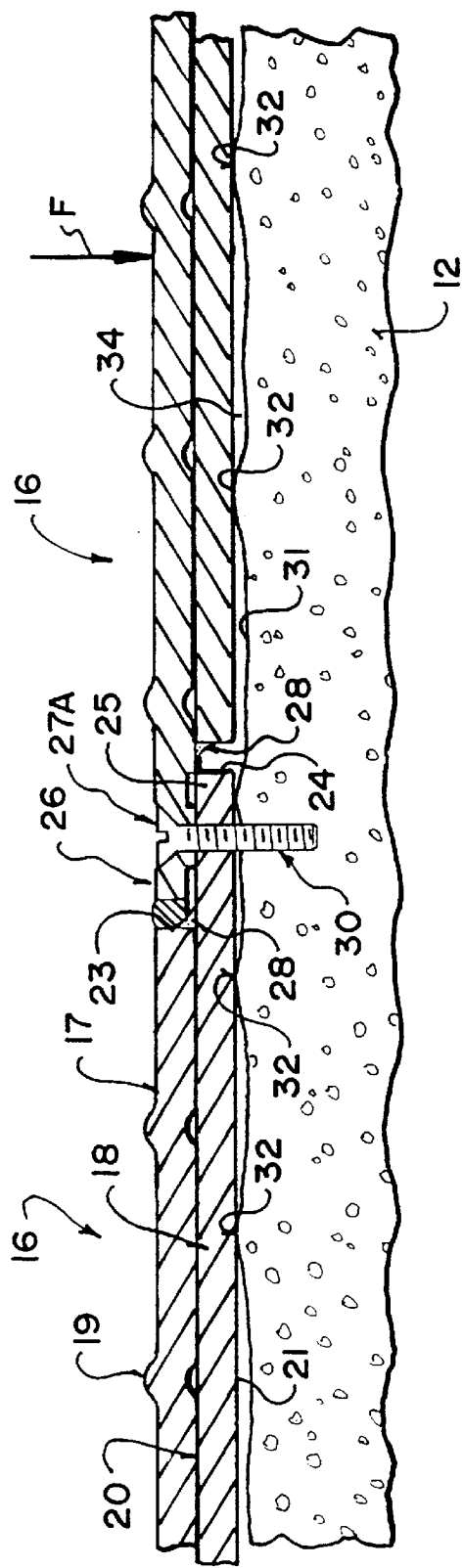
FIG. 2 is a cross sectional view along the lines 2—2 on an enlarged scale.

In the arrangement shown in FIGS. 1 and 2, the roadway is thus covered by a plurality of individual sheets 16 of steel or other rigid conductive material. The sheets are arranged edge to edge and are dimensioned such that the array of sheets covers in effect the whole of the roadway across the width and length of the area of the roadway to be treated. Thus in one example the sheets may be four feet in width and eight feet in length. Sheets of this size can be individually handled so that they can be laid out across the roadway in the array as shown and subsequently fastened together to form a complete layer covering the roadway.

The sheets 16 in this embodiment are formed from two separate layers including an upper layer 17 and a lower layer 18. The upper layer 17 is embossed by pressing to form ribs 19 on the upper surface thus generating a reduced slip surface for the passage of the traffic. The embossment of the layer 17 generates recesses in the bottom surface of the layer 17 but these are covered by the planar layer 18 which has a planer upper surface 20 and a planar lower surface 21.

The layer 17 is offset relative to the layer 18 so that one side edge 21 of the layer 17 is offset from the adjacent side edge 22 of the layer 18 thus defining a flange along the side edges. The layer 17 is similarly offset at one end so that an end edge 23 of the layer 17 is offset from an end edge 24 of the layer 18. In this way the layer 18, as shown in FIG. 2, extends beyond the edge 23 to form a flange 25 at the bottom of the sheet 16. Similarly at the opposite end edge, the upper layer 17 extends beyond the edge of the lower layer 18 to form an upper flange 26. These flanges are then bolted together using carriage bolts 27 or similar fasteners.

The layer 17 is welded to the layer 18 around the edges as indicated at 28 so as to form an integral sheet structure with intimate contact between the upper planar surface of the lower layer 18 and the bottom surface of the layer 17.

As shown in FIG. 1 the flanges at the edges of the sheets are arranged to overlap and the whole structure defined by the series of sheets is bolted together by the fasteners 27. Some of the fasteners indicated at 27A extend through the two flanges into drilled holes 30 in the concrete layer so as to hold all of the sheets in place to prevent creeping of the sheets across the concrete surface in response to the continual movement of traffic.

In replacement for the bolted fasteners 27, the flanges can be fastened by tac welding effected on site which can be broken when the process is complete.

In this way the sheets are interconnected to form an integral structure so that electrical connection to the sheets from the current source 14 applies a voltage to the sheets. If required, more than one current source may be provided to maintain the voltage across the area of the sheets generally constant and to maintain the current flow in the electrolytic process generally equal at different areas of the roadway.

While the bottom surface 21 of the sheets is substantially planar, the surface 31 of the concrete layer 12 has some unevenness forming ridges 32 at various points across the surface.

In FIG. 2, the sheets 16 lie directly on top of the surface 32 with no intervening material except that a layer of electrolyte 34 in liquid form is placed between the surfaces as a continuous layer filling the interstices in the concrete and filling the valleys between the ridges 32.

In order to maintain the liquid electrolyte filling the area between the surfaces, a supply pipe 35 is provided with a supply tank 36 supplying the liquid electrolyte to the supply pipe which is then allowed to discharge through openings in the supply pipe 35 at spaced positions along the pipe. The pipe is laid along one side edge of the sheets which is selected as the higher edge thus allowing the liquid electrolyte to flow gradually through the interstices and valleys as indicated at 37 toward a discharge area 38 which generally is the lowest point of the area of the roadway covered by the sheets. At this location, the electrolyte can be collected or can be simply allowed to discharge as preferred in this situation.

The surface tension in the electrolyte will generally maintain the valleys and interstices filled and prevent voids between the surfaces, despite the pumping effect which may occur due to the passage of traffic.

The electrolyte is generally water but other materials or additives within water can be used if preferred.

The electrolytic action therefore occurs from the sheets 16 as the anode to the reinforcing bars 13 as the cathode with the current being communicated through the electrolyte between the surfaces and through the concrete material 12 to effect the transfer the ions as shown in FIG. 4. The steel sheets as the anode act as a sacrificial anode so that the steel is consumed in the process and thus avoiding the production of hydrochloric acid within the electrolyte layer. The process operates without the necessity for an additional anode between the steel sheets and the concrete surface thus avoiding the necessity for the complex structure used in the prior art defined by the wire mesh anode and the embedding absorption material for supporting the electrolyte. In this arrangement, therefore the forces from the traffic or vehicles are communicated as indicated at F directly through the combined sheets into the ridges 32 of the concrete surface without the necessity for spacers or supporting the steel sheets other than on the concrete surface. The absence of any significant layer of an absorptive material between the underside of the sheet and the concrete surface avoids any pumping action caused by compression and expansion of the absorptive layer.

Figure 3:
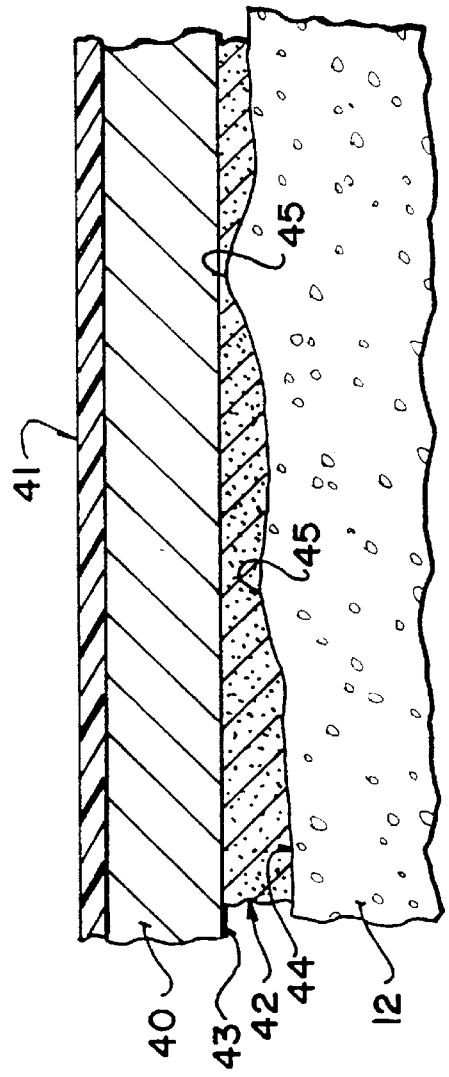
FIG. 3 is a similar cross sectional view to that of FIG. 2 showing a modified arrangement.

Turning now to FIG. 3, there is shown a sheet 40 which is formed as an integral layer without the necessity for the separate layers 17 and 18 of FIG. 2. In this embodiment an additional coating 41 is applied onto the top surface which acts as an anti-slip material and also can be non-conductive so as to avoid the potential for conducting current from the voltage on the sheet 40 to any touching conductive element.

Also in FIG. 3 there is provided an arrangement in which a particulate material 42 is provided between the underside 43 of the sheet 40 and the top surface 44 of the concrete. Again the concrete has valleys and ridges 45. The particulate material can fill only the valleys or may in some cases also be sufficiently thick so as to extend over some or all of the ridges 45. The particulate material may simply be sand or similar non-absorptive material which allows the liquid electrolyte to collect in the interstices between the particulate material, within the concrete structure and within the valleys between the surface 43 and the surface 44. A binder such as portland cement can be added to the sand to stabilize the structure against the pumping effect of the passing traffic.

The provision of the intervening particulate material between the surfaces is desirable when the surface is sufficiently irregular that it is not possible to maintain a complete layer of the electrolyte without formation of voids due to the width of the maximum spaces between the spaces 43 and 44. However the use of the non-absorptive material such as sand ensures that there is little or no resilience and little or no compressive effect so that the loads applied to the sheet 40 are directly communicated from the bottom surface of the sheet 40 through the particulate material or through the ridges 45 into the concrete.

In FIG. 4 is shown a further arrangement in which the sheet 15 is applied on top of a thin absorptive layer 50 which lies on top of the surface 51 of the concrete. The thin absorptive material may be a felt or similar integral layer which is applied onto the surface 51 prior to application of the sheets. The absorptive layer 50 absorbs the electrolyte and holds the electrolyte to maintain continuous electrical communication between the surface 51 and the sheet 15. In this arrangement the thin layer of the absorptive material 50 is sufficiently thin that the forces from the traffic are communicated through the sheet 15 to the ridges 52 in the concrete with the absorptive material being fully compressed so that there is little or no resilience and little or no pumping effect at expansion and contraction caused by that resilience. Again, therefore, the sheet sits effectively so it is supported by the concrete surface and the forces from the traffic are communicated to the concrete surface through the sheets.

These arrangements, therefore, allow the passage of traffic to continue during the treatment process so that the traffic passes over the upper surfaces of the sheets with the load from the traffic being applied to the concrete surface.

In FIG. 4, the upper surface of the sheet includes a series of welded transverse ribs 54 which provide the anti-slip effect while the bottom surface of the sheet is planar and smooth so as to lie directly on top of the concrete surface.

An additional enhancement of the above method can be achieved by adding into the electrolyte solution a calcium or magnesium salt which is preferably calcium hydroxide (lime) but could be any other suitable soluble calcium based salt which is of a type which is not detrimental to concrete. Calcium based salts are preferred as they are significantly less expensive than corresponding magnesium salts.

The calcium hydroxide is added into electrolyte in solution and this has a number of advantageous effects. Firstly the calcium ions can be drawn into the structure of the concrete to enter the pores in the concrete and thus reduce the permeability of the treated concrete after the treatment is complete. Secondly the provision of the calcium in solution will reduce the consumption of the steel plate anode. Thirdly, in an arrangement which does not provide a consumable steel anode and instead uses a non consumable metal anode, the provision of the calcium hydroxide will reduce acid generation in the electrolyte.

The arrangement described hereinbefore, the traffic passes directly over the upper surface of the steel plates. In this arrangement the steel plates are preferably imperforate but they may include some openings which are insufficient to affect the structural strength thereof so that the plates are sufficiently rigid to receive the load from the traffic and to apply that load to the concrete surface.

In an alternative arrangement, however, the steel plates may be covered by a thin, non-structural layer, such as concrete or asphalt to act as a wear surface during the treatment process. The thin covering layer therefore acts as a wear surface to reduce the direct application of wear from the traffic to the upper surface of the steel plates. Further, the layer acts to provide some traction to reduce the slipperiness of the upper surface of the steel plates. If the layer is impermeable, the electrolyte can be fed to the edges of the sheet as, previously described so as to percolate to the required locations.

In some cases, the layer can be porous to allow penetration of fluids. Such a layer can be formed from asphalt or it can be formed from an open grade concrete mix. Such a concrete mix is obtained by reducing the amount of sand in the mixture so that the mix forms a temporary covering layer and a layer which is sufficiently porous to allow the penetration of liquid.

This porous layer can be used where it is desired to apply the electrolyte through the porous covering layer so that the electrolyte permeates through the porous layer and through perforations in or through the joints between the steel plates to form the layer underneath the steel plates and on top of the upper surface of the concrete. The porous covering layer is relatively thin so that it does not provide any structural strength but merely allows the forces from the traffic to pass through the thin layer into the steel plates as previously described. The porous layer has the advantage therefore that it allows the penetration of the electrolyte as previously described while allowing the use of some perforations in the steel plate and maintaining the electrolyte in the required position at the surface of the concrete.

What is claimed is:

1. A method for restoration of an existing set concrete deck comprising:

providing a generally horizontal load bearing concrete deck having a generally horizontal upper surface over which traffic can pass, the concrete deck having metallic reinforcing elements and the concrete therein being in a set condition;

placing on the horizontal upper surface an electrically conductive anode;

connecting an electrical current between the metallic reinforcing elements as a cathode and the electrically conductive anode so as to cause current to flow therebetween;

providing an electrolyte between the anode and the upper surface so that the current causes movement of ions between the anode and the cathode within the concrete;

CHARACTERIZED IN THE STEPS OF:

providing the electrically conductive anode so as to consist solely of a rigid sheet of a consumable steel material having an upper surface and a substantially planar lower surface which is placed onto the upper surface of the concrete deck with the electrolyte therebetween such that the ions are withdrawn from the concrete into the electrolyte;

attaching the rigid sheet to the deck to prevent movement of the sheet relative to the deck;

causing the traffic to pass over the upper surface of the sheet while the sheet is in place on the concrete deck such that forces from the traffic are communicated through the upper surface to the sheet;

and locating the planar lower surface of the sheet relative to the upper surface of the concrete deck such that, substantially over the full area of the sheet, each point on the lower surface of the sheet receives direct support from a corresponding underlying point on the upper surface of the concrete deck and that forces applied to the upper surface of the sheet by the traffic are communicated directly from the lower surface of the sheet to the upper surface of the concrete deck through the corresponding points.

2. The method according to claim 1 including causing the traffic to pass directly over the upper surface of the sheet while the sheet is in place on the concrete deck such that the traffic passes directly in contact with the upper surface of the sheet and such that forces from the traffic are communicated through the upper surface to the sheet.

3. The method according to claim 2 including providing on the upper surface of the sheet projecting elements to increase frictional grip between the traffic and the sheet.

4. The method according to claim 3 including providing the sheet as a lower layer and an upper layer, the upper layer being embossed to provide said projecting elements thereon and the lower layer being smooth to provide said planar lower surface and fastening the layers together to form an integrally transportable unit and an electrically integral anode.

5. The method according to claim 4 including fastening one layer offset laterally from the other to provide side edges which overlap with a next adjacent sheet and fastening the sheet to the next adjacent sheet at the side edges.

6. The method according to claim 1, wherein the electrolyte is a fluid material and including providing between the lower surface of the sheet and the upper surface of the concrete deck a filler material sufficient to carry the electrolyte and to prevent the presence of spaces between the surfaces which are empty of the electrolyte and including transmitting the forces through the filler material.

7. The method according to claim 6 wherein the filler material is a compressible material and has a thickness only sufficient to fill unevenness between the surfaces.

8. The method according to claim 6 wherein the filler material is a particulate material.

9. The method according to claim 1, including placing the lower surface of the sheet directly in contact with the upper surface of the concrete deck, the electrolyte comprising a layer of a fluid material maintained in interstices between the surfaces by surface tension in the fluid material.

10. The method according to claim 1 including adding a calcium or magnesium salt to the electrolyte.

11. The method according to claim 1 including applying over the steel sheet a thin, non structural cast layer as a wear surface over which the traffic passes.

12. The method according to claim 11 wherein the layer is porous to allow the penetration therethrough of liquid.

13. The method according to claim 12 wherein the electrolyte is supplied through the porous layer.

14. The method according to claim 13 wherein the steel plate is perforated to allow the electrolyte to pass through the plate from the porous layer to the upper surface of the concrete.

* * * * *